May 13, 1969  M. N. TODD, JR  3,443,853
OPTICAL SYSTEM FOR DETERMINED AREA RADIATION SCANNING
Filed Dec. 2, 1966
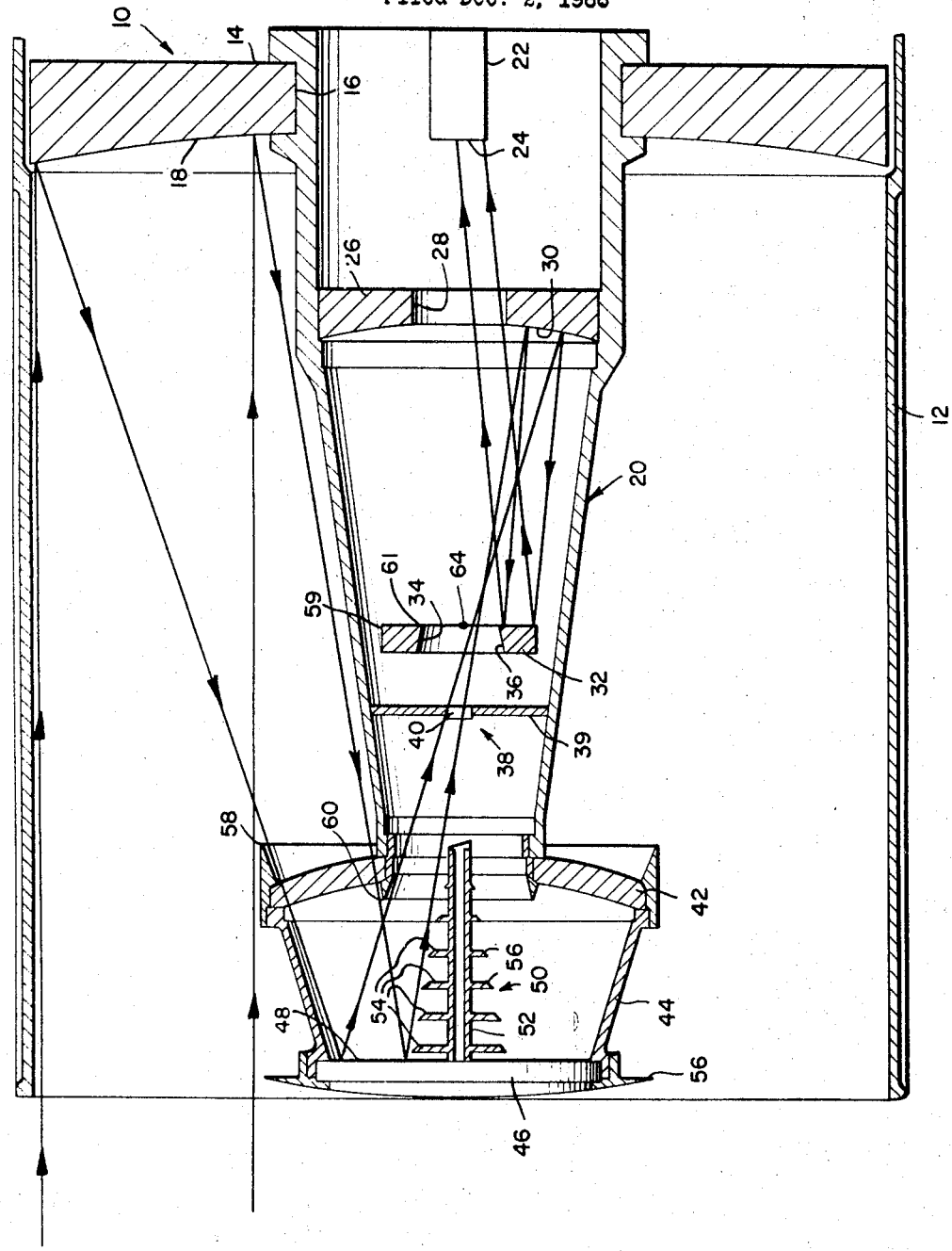
Marion N. Todd, Jr.,
INVENTOR.
BY
ATTORNEY.

United States Patent Office 3,443,853
Patented May 13, 1969

3,443,853
OPTICAL SYSTEM FOR DETERMINED AREA RADIATION SCANNING
Marion N. Todd, Jr., Santa Monica, Calif., assignor to Hughes Aircraft Company, Culver City, Calif., a corporation of Delaware
Filed Dec. 2, 1966, Ser. No. 598,839
Int. Cl. G02b 17/06
U.S. Cl. 350—55     9 Claims

ABSTRACT OF THE DISCLOSURE

The disclosed optical system incorporates a primary reflecting mirror, a secondary focus and optically interposed field stop and aperture stop arrangement. A folding mirror and a secondary reflecting mirror are appropriately mounted on a central supporting structure and the entire arrangement is constructed to be radiation absorbing whereby only a determined field of view is focused at the secondary focus and unwanted specular and diffuse radiation is efficiently eliminated. As a result accurate detection of very faint radiation sources over the field of view is achieved.

---

The invention relates to an optical system for use in determined area scanning. The system disclosed is particularly useful, though not limited to, relatively long range small field area scans wherein the field of view is focused upon an imaging device, such as detector arrays or an image tube. The sensitivity of the imaging device and reproduction accuracy require shielding to eliminate wherever possible radiation originating outside the field of view from impinging on the imaging device.

Optical systems of the type here considered are normally referred to in the art as telescopes. They are frequently utilized for specific missions, that is, to locate a particular source of radiation and after location to hold the source in the field of view. It will be understood, however, that the optical system herein disclosed may be utilized for other purposes in addition to that described above.

To maximize the utility of the optical system herein disclosed, the design must be such that certain important parameters are met.

For example, when in flight, the system desirably is particularly insensitive to off-view axis radiation such as may emanate from the sun, the earth, or other heavenly bodies.

In certain applications, it may be desirable to limit scanned radiation to a determined spectral band and provisions for such limitation may be made. Optical imagery over the field of view, reasonably, must be of high quality. Aperture modulation due to extraneous radiation should be at a minimum. Additionally, the structure should be relatively rigid to avoid distortion, misalignment, or other failure due to vibration, mechanical shock or thermal shock in use.

It will thus be understood that it is a primary object of the invention to provide an optical system or telescope which meets the requirements set forth in the preceding paragraphs and is particularly adapted to an efficient use in its design environment.

It is a further object of the invention to provide a telescope of the type described which incorporates a novel modification of what has heretofore been known as a Gregorian type optical system and thereby, and in a unique manner, meet service requirements.

Those familiar with this art will understand that to obtain accurate detection of very faint radiation over a determined viewing area, the telescope design must be such as to reduce to a minimum both specular and diffusely reflected radiation reaching the imaging device and originating outside the field of view. To provide such a result and meet the other service requirements, noted above, the particular invention utilizes a cylindrical housing having an annular viewing primary mirror to initially collect energy from the desired field of view. The primary mirror reflects the energy emanating from the field to a first folding mirror and the radiant energy is then reflected to a secondary mirror. A secondary focus plane is provided at an appropriate imaging device and a scan mirror is positioned to receive the viewed field from the secondary mirror and, by appropriate oscillation, display the viewed field over an area at the imaging device and secondary focus. All of the reflecting surfaces are arranged about a common axis. The design incorporates, in addition to the annular housing, a central supporting column which provides the necessary strength, rigidity and alignment. A novel arrangement of field stop, exit pupil and baffles reduces to a minimum the transmission to the secondary focus or detecting device, of scattered or undesired radiation. The design is also such that refraction errors are minimized and transmission distortions due to wide temperature variations reduced to a minimum.

The above and many other features and advantages of the disclosed invention will become apparent in the course of the following description and from an examination of the related drawings, wherein:

The single figure is a central, vertical, cross-sectional view, partly in elevation, illustrating the telescope structure.

In describing a preferred embodiment of the invention, the geometric configuration of the reflecting surfaces will be specifically described. It will be understood, however, that the configurations of the various reflecting surfaces may be altered to fit other optical requirements all within the scope of this disclosure.

Describing the invention in detail, the telescope is indicated generally at 10 and comprises an annular cylindrical housing 12. At the rear aspect of the housing 12 a primary mirror 14 is provided which is annular in form having a central opening at 16. The mirror 14 is preferably provided with a forwardly facing parabolic reflecting surface 18. An annular rigid central support column 20 securely mounts the mirror 14 at its inner aperture 16. The column is annular in form and of forwardly diminishing conical configuration as seen in sectional view. This structure provides essential strength, rigidity and alignment. Within the support column 20 an imaging device 22, of conventional form, may be provided and the sensitive surface 24 thereof is positioned in the plane of the secondary focus of the system as will hereinafter be described. Within the conical central support column 20 and forwardly of the secondary focus plane 24, an annular secondary mirror 26 is securely mounted from the inner surface of the column 20. Secondary mirror 26 has a central aperture 28 and a forwardly facing elliptical reflecting surface 30. An annular scan mirror 32 is mounted forwardly of the mirror 26 and within the conical support column 20. The inner edge of the aperture 34 is preferably beveled as at 36 to present a surface which avoids reflecting scattered radiation to the secondary focus plane 24.

A particular feature of the disclosed optical system relates to the provision of a determined area physical field stop at 38 forwardly of the scan mirror 32 and a physically defined aperture stop structure located at the exit pupil of the optical system. The field stop comprises a generally flat plate 39. The forward face of plate 39 is preferably coated with black or other radiation absorbing material to offer a blackbody effect. A central aperture 40 of determined configuration is provided in plate 39 and defines the field of view which is transmitted to the secondary mirror 26 as will hereinafter be described. In this connection the aperture 40 may be of any configuration such as circular, rectangular, square, or the like, depending upon the desired configuration of the view field.

At the forward aspect of the central conical support column 20, an annular window 42 is provided. The window 42 may be of any material, for example, one which is transparent to virtually all wavelengths within the desired spectral band. If desired, the window may be a specific material adapted to limit transmitted radiation to particular wavelengths. Alternately, the surfaces of window 42 may be surface coated to filter all wavelengths except those whose transmission is desired. Such coatings are generally known in the art as dielectric band pass filters.

The outer peripheral edge of the window 42 supports a secondary conical structure 44 which mounts a first folding mirror 46 at its forward aspect. The mirror 46 is provided with a reflecting surface 48 on its rearwardly directed face. Centrally of the face 48 a baffle 50 is provided, said baffle comprising a central column 52 having annular outwardly directed plates 54, 54, incrementally spaced thereon and of diminished diameter as the spatial distance from the reflecting surface 48 is increased. Each plate 54 has its outer annular edge beveled as at 56, 56, toward the reflecting surface 48, the purpose of which will hereinafter be described. It will be understood that the configuration of the baffle 50, as illustrated, is not the only configuration that may be employed. It should, however, be located outside the propagation line of the reflected radiation beam and be highly radiation absorptive to capture unwanted scattered radiation.

As an aid in controlling scattered radiation, the second conical structure 44 is provided with sharp peripheral edge 56 in the area of support for the mirror 46 and a rearwardly directed annular sharp edge 58 in the area of support of the window 42. Additionally, the forward terminus of central support column 20 is provided with a sharp annular edge 60, again the function of which will hereinafter be described in detail.

In certain environments, it may be desirable to limit radiation emanating from the telescope per se. Under such circumstances, the entire structure may be conventionally cooled to the desired level including those in the cryogenic range. In many cases the operation of the imaging device is thus improved.

If service dictates that the telescope will encounter a wide variation in temperature, a preferred embodiment of the invention utilizes metallic materials such as beryllium or aluminum to form the primary mirror 14, the first folding mirror 46, the secondary mirror 26, the scan mirror 32, and supporting structure. In this manner distortions due to physical misalignment as a result of varying expansion characteristics is avoided.

While it is true that the coefficient of the expansion of the window 42 may not be identical to the rest of the telescope structure, the window 42 is provided with arced surfaces at the front and rear edge thereof which are centered approximately from the point of primary focus of mirror 14, i.e., at the aperture 40 of stop 38. This minimizes refractive distortion even though there may be a variation in physical expansion or contraction of the window 14 due to temperature change.

For purposes of this disclosure, it will be understood that specular radiation will be considered that type of radiation which reflects from a surface at an angle approximately equal to the angle of impingement thereon. For practical purposes it does not reflect at any other angle. Diffuse radiation, on the other hand, is radiation which leaves a comparatively rough surface or surface having defects therein substantially uniformly through all angles and at relatively uniform intensity through all angles. The structure described effectively eliminates the transmission of either specular or diffuse scattered radiation to the detector arrangement 22. For example, extended edge 58 shields the window 42 from specular radiation which may enter the forward aspect of the cylinder 12 in angular relation to the axis of the cylinder. Additionally, the annular edges 59 and 61 which define the aperture stop limit the transmitted beam to that being received by the surface 18 of the primary reflecting mirror 14, that is, trims the inner and outer edges thereof. At the field stop 38 the aperture 40 is positioned at the focus point of the primary mirror 14. The aperture 40 within the stop is precisely sized to define the exact field of view which will be transmitted of the total beam received by mirror 14. It is only radiation within this area that passes to secondary mirror 26 and thereafter is reflected to scan mirror 32. The field stop 38 edge limits all other radiation.

Scan mirror 32 is cylindrical in form and may be mounted to oscillate slightly about pivot 64. The slight oscillation provides a linear scan at the secondary focus plane 24 across the face of the detector package 22. The outer and inner edges 59 and 61 of mirror 32 precisely define the reflected beam, i.e., the beam that is focused and scanned at the sensitive surface 24 of imaging device 22. All other radiation emanating from mirror 26 is absorbed by the radiation absorbing internal surface of column 20. In order to prevent diffuse reflection from the internal surface 36 of the scan mirror 32, the surface is beveled outwardly and forwardly as seen in the sectional view of the figure. The optical transmission of the received energy is shown by the arrowed lines, only one illustrative path being shown as all mirrors are congruently formed about the central axis of the arrangement.

All of the structure illustrated except the reflecting mirrors and window may be covered with a radiation absorbing material to provide a blackbody effect. Thus, there is a maximum absorption of specular and diffuse radiation with minimum effect on the sensitive imaging device 22.

It will thus be apparent that the telescope design described is readily adapted for area scan in conjunction with radiation detector devices. The structure is relatively well-shielded and therefore insensitive to virtually all scattered or off-axis radiation. The structure is strong incorporating a central columnar type support which maintains the relative parts in close dimensional alignment in spite of mechanical and thermal shock. The design also provides high quality imagery of the field of view in that all optically working surfaces are deflective and errors due to possible refractive distortions and the like are avoided.

The invention as shown is by way of illustration and not limitation and may be modified in various particulars all within the scope of the appended claims.

What is claimed is:

1. In an optical system for area scanning and to transmit a radiation beam to a secondary focus,
   a primary reflecting mirror,
   a secondary reflecting mirror optically downstream from the primary mirror and the focus of the primary mirror,
   a first reflecting folding mirror optically interposed between the primary mirror and its focus,
   a field stop located approximately at the focus of the primary mirror and defining the field of view,
   a scan mirror optically arranged to receive an image from said secondary mirror and reflect said image to a secondary focus,
   the peripheral edges of the scan mirror defining the limits of the beam being reflected to the secondary focus, and
   means to shield said secondary focus from scattered radiation originating outside of the field of view, all reflecting surfaces of the primary mirror, secondary mirror, folding mirror, and scan mirror being concentrically arranged about a common axis.

2. An optical system for area scanning according to claim 1, wherein said field stop comprises a radiation absorbing plate having an aperture therein defining the field of view.

3. An optical system for area scanning according to claim 2, wherein said scan mirror is generally annular in form and is provided with a central opening defining the exit pupil of the system.

4. An optical system for area scanning according to claim 3, wherein said shielding means includes radiation absorbing baffle structure positioned adjacent the first folding mirror and outside the area of beam transmission from the first folding mirror to the primary mirror focus.

5. An optical system for area scanning according to claim 4, and including,
   conical supporting structure concentrically arranged about said common axis,
   said structure having a radiation absorbing surface and carrying the secondary mirror, scan mirror, field stop and first folding mirror.

6. An optical system for area scanning according to claim 5, and including,
   a radiation filtering window carried by said supporting structure and optically interposed between the primary mirror and folding mirror,
   the opposed surfaces of said window being arced,
   said arcs having radii approximately centered at the primary focus.

7. An optical system for area scanning according to claim 6, wherein said shielding means comprises a housing peripherally surrounding the system,
   said shielding means further including an annular extension element carried by said folding mirror and extending radially outwardly therefrom to define the inner limit of the radiation beam being received by the primary mirror, and
   cylindrical elements formed concentrically with said common axis and carried by said support structure to define the annular outer limit of the radiation beam being reflected from the primary mirror to the folding mirror and reflected from the folding mirror to the focus of the primary mirror.

8. An optical system for area scanning according to claim 7, wherein the inner surface of said scan mirror defining said central opening has a bevel formed thereon generally facing said primary focus.

9. In an optical system for area scanning to transmit a radiant energy beam to a secondary focus,
   the combination of a housing surrounding the system and having an opening at one end thereof to expose a scan area,
   the inner surface of said housing being radiation-absorbing,
   a primary reflecting mirror at one end of the housing,
   a secondary reflecting mirror adjacent the primary mirror and optically downstream from the focus of the primary mirror,
   a first reflecting folding mirror at the other end of the housing and optically interposed between the primary mirror and its focus,
   a field stop comprising a plate having radiation-absorbing surfaces thereon and a central aperture to define the field of view of the system,
   a reflecting scan mirror optically interposed between the field stop and the secondary reflecting mirror,
   said scan mirror being operative to transmit the beam from the secondary reflecting mirror to the focus of the secondary reflecting mirror,
   the outer edge of the scan mirror determining the limit of the reflected beam being transmitted to the secondary focus,
   said scan mirror being annular in form and defining a central opening comprising the exit pupil of the primary reflecting mirror,
   said primary reflecting mirror, first folding mirror, secondary reflecting mirror, scan mirror and field stop being concentrically arranged about a common axis and having a common supporting structure therefor,
   said supporting structure having radiation absorbing surfaces thereon, and
   baffle means carried by the first folding mirror concentric with said common axis and outside the area of the area being reflected from the first folding mirror to said primary mirror focus.

References Cited

UNITED STATES PATENTS

| | | | |
|---|---|---|---|
| 2,737,850 | 3/1956 | Raitiere | 350—294 |
| 2,995,973 | 8/1961 | Barnes et al. | 350—55 X |
| 2,326,552 | 8/1943 | Morse | 350—55 |
| 2,504,383 | 4/1950 | Bouwers et al. | 350—27 X |
| 3,160,751 | 12/1964 | Dunning | 350—199 |
| 3,206,603 | 9/1965 | Mauro | 350—294 |
| 3,244,885 | 4/1966 | McHenry | 350—294 |

FOREIGN PATENTS 544,348  4/1942  Great Britain.

DAVID SCHONBERG, *Primary Examiner.*

P. R. GILLIAM, *Assistant Examiner.*

U.S. Cl. X.R.

350—27, 199, 294